US 9,358,870 B2

(12) United States Patent
Hotta et al.

(10) Patent No.: US 9,358,870 B2
(45) Date of Patent: Jun. 7, 2016

(54) VEHICLE DRIVE DEVICE

(71) Applicant: AISIN AW CO., LTD., Anjo-shi, Aichi-ken (JP)

(72) Inventors: Yutaka Hotta, Chiryuu (JP); Tatsuyuki Uechi, Toyoake (JP); Hiromichi Agata, Nishio (JP); Kazuo Aoki, Anjo (JP); Tatsuya Kondo, Okazaki (JP); Manabu Miyazawa, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/409,810

(22) PCT Filed: Jul. 18, 2013

(86) PCT No.: PCT/JP2013/069493
§ 371 (c)(1),
(2) Date: Dec. 19, 2014

(87) PCT Pub. No.: WO2014/017373
PCT Pub. Date: Jan. 30, 2014

(65) Prior Publication Data
US 2015/0251531 A1 Sep. 10, 2015

(30) Foreign Application Priority Data

Jul. 27, 2012 (JP) ................................. 2012-167684

(51) Int. Cl.
*B60K 6/04* (2006.01)
*B60K 6/405* (2007.10)
(Continued)

(52) U.S. Cl.
CPC . *B60K 6/405* (2013.01); *B60K 1/00* (2013.01); *B60K 6/36* (2013.01); *B60K 6/40* (2013.01);
(Continued)

(58) Field of Classification Search
CPC .......... B60K 6/26; B60K 6/365; B60K 6/405; B60K 6/48; B60K 6/547; B60K 6/36; B60K 6/54; B60K 17/16; B60K 17/04; B60L 11/14; B60L 11/1803
See application file for complete search history.

(56) References Cited

U.S. PATENT DOCUMENTS 5,562,565 A * 10/1996 Moroto ................. B60K 6/365
180/65.6
5,875,691 A * 3/1999 Hata ..................... B60K 6/365
475/5
(Continued)

FOREIGN PATENT DOCUMENTS

JP   A-2000-21705    8/2000
JP   A-2001-354040   12/2001
(Continued)

OTHER PUBLICATIONS

Machine Translation of JP200926259, Dec. 10, 2015, <http://worldwide.espacenet.com>.*

*Primary Examiner* — Brodie Follman
*Assistant Examiner* — Brian Cassidy
(74) *Attorney, Agent, or Firm* — Oliff PLC

(57) ABSTRACT

The overall outer shape of a vehicle drive device including an inverter device is reduced in size. An input member and a rotating electrical machine are arranged side by side on a first axis, and a differential gear unit is placed on a second axis. An inverter device is located so as to overlap the differential gear unit as viewed in a radial direction, and is located between a second reference line that extends perpendicularly to a first reference line passing through the first axis and the second axis and that passes through the first axis and a third reference line that extends perpendicularly to the first reference line and that passes the second axis, as viewed in an axial direction.

20 Claims, 9 Drawing Sheets

(51) Int. Cl.
- *B60K 6/40* (2007.10)
- *B60K 6/48* (2007.10)
- *B60L 11/14* (2006.01)
- *B60K 6/547* (2007.10)
- *B60K 6/36* (2007.10)
- *B60K 6/54* (2007.10)
- *B60K 17/04* (2006.01)
- *B60K 17/16* (2006.01)
- *B60L 11/18* (2006.01)
- *B60K 1/00* (2006.01)

(52) U.S. Cl.
CPC ... *B60K 6/48* (2013.01); *B60K 6/54* (2013.01); *B60K 6/547* (2013.01); *B60K 17/04* (2013.01); *B60K 17/16* (2013.01); *B60L 11/14* (2013.01); *B60L 11/1803* (2013.01); *B60K 2001/001* (2013.01); *B60K 2006/4825* (2013.01); *B60Y 2200/92* (2013.01); *B60Y 2400/61* (2013.01); *Y02T 10/6221* (2013.01); *Y02T 10/70* (2013.01); *Y02T 10/7077* (2013.01); *Y10S 903/902* (2013.01)

(56) References Cited

U.S. PATENT DOCUMENTS

| | | | |
|---|---|---|---|
| 6,059,684 A * | 5/2000 | Sasaki | F16H 57/028 180/65.6 |
| 6,155,364 A * | 12/2000 | Nagano | B60K 6/365 180/65.235 |
| 6,166,498 A * | 12/2000 | Yamaguchi | B60K 6/26 180/65.235 |
| 6,323,613 B1 * | 11/2001 | Hara | B60K 6/26 165/299 |
| 6,533,696 B1 * | 3/2003 | Takenaka | B60K 6/40 180/65.235 |
| 6,822,353 B2 * | 11/2004 | Koga | F28D 1/035 310/52 |
| 6,877,578 B2 * | 4/2005 | Krzesicki | B60K 6/44 180/243 |
| 7,222,685 B2 * | 5/2007 | Takenaka | B60K 6/22 180/65.1 |
| 7,244,210 B2 * | 7/2007 | Hamai | B60K 6/44 475/150 |
| 7,600,769 B2 * | 10/2009 | Bessho | B60G 9/022 280/124.109 |
| 7,649,292 B2 * | 1/2010 | Moriya | B60K 6/26 310/112 |
| 7,847,450 B2 * | 12/2010 | Kakuda | B60K 6/405 310/89 |
| 7,851,954 B2 * | 12/2010 | Endo | B60K 6/26 310/68 D |
| 7,855,887 B2 * | 12/2010 | Kakuda | B60K 6/365 165/104.33 |
| 7,896,116 B2 * | 3/2011 | Tatematsu | B60K 6/365 180/65.21 |
| 7,932,624 B2 * | 4/2011 | Yoshida | B60K 6/26 180/65.21 |
| 7,988,579 B2 * | 8/2011 | Tabata | B60K 6/365 475/5 |
| 8,074,753 B2 * | 12/2011 | Tahara | B60K 6/26 180/65.21 |
| 8,181,731 B2 * | 5/2012 | Bessho | B60K 5/04 180/305 |
| 8,272,462 B2 * | 9/2012 | Yoshida | B60K 1/02 180/65.1 |
| 8,328,674 B2 * | 12/2012 | Swales | B60K 6/365 475/151 |
| 8,381,853 B2 * | 2/2013 | Iwaki | B60L 3/0076 180/165 |
| 8,397,845 B2 * | 3/2013 | Yoshida | B60K 6/26 180/65.1 |
| 8,444,518 B2 * | 5/2013 | Tanae | B60K 6/405 475/5 |
| 8,622,862 B2 * | 1/2014 | Koyama | B60K 6/36 180/65.21 |
| 8,790,202 B2 * | 7/2014 | Sakai | B60K 6/365 475/5 |
| 8,808,125 B2 * | 8/2014 | Tsuchida | B60K 6/40 180/65.235 |
| 8,960,034 B2 * | 2/2015 | Takahashi | B60K 6/445 475/5 |
| 8,974,338 B2 * | 3/2015 | Holmes | B60K 6/365 475/218 |
| 2004/0121870 A1 * | 6/2004 | Takenaka | B60K 6/26 475/5 |
| 2010/0072865 A1 * | 3/2010 | Endo | B60K 6/365 310/68 D |
| 2011/0294620 A1 * | 12/2011 | Pruitt | B60K 6/48 477/5 |
| 2014/0132379 A1 * | 5/2014 | Vafakhah | H01F 37/00 336/57 |
| 2014/0132382 A1 * | 5/2014 | Zarei | F16H 57/0417 336/61 |
| 2014/0175867 A1 * | 6/2014 | Sung | F16H 57/0412 307/9.1 |
| 2014/0256490 A1 * | 9/2014 | Honda | B60K 6/52 475/5 |
| 2014/0352491 A1 * | 12/2014 | Ross | B60K 6/42 74/661 |
| 2014/0374211 A1 * | 12/2014 | Date | B60K 6/387 192/85.01 |
| 2015/0107920 A1 * | 4/2015 | Sakamoto | B60K 1/00 180/65.31 |
| 2015/0283955 A1 * | 10/2015 | Sakamoto | F16B 5/0241 248/636 |

FOREIGN PATENT DOCUMENTS

| JP | A-2003-23777 | 1/2003 |
| JP | A-2006-36165 | 2/2006 |
| JP | A-2007-221962 | 8/2007 |
| JP | A-2008-113540 | 5/2008 |
| JP | A-2009-262859 | 11/2009 |

* cited by examiner

VEHICLE DRIVE DEVICE

TECHNICAL FIELD

Exemplary embodiments discussed below relate to vehicle drive devices including an input member that is drivingly coupled to an internal combustion engine, output members that are drivingly coupled to wheels, a rotating electrical machine, a differential gear unit, and an inverter device.

BACKGROUND ART

A vehicle drive device as described in Japanese Patent Application Publication No. 2001-354040 (JP 2001-354040 A) (Patent Document 1) is known as such a vehicle drive device. In this drive device, a first axis SH1 on which an electric generator motor 16 and a planetary gear unit 13 are placed, a second axis SH2 on which a drive motor 25 is placed, and a third axis SH3 on which a differential device 36 is placed are arranged at different positions from each other as viewed in an axial direction. The electric generator motor 16 and the drive motor 25 are arranged so as to overlap each other as viewed in a radial direction, and an inverter device is attached to a tilted wall 49 that is parallel to a common tangent line tangential to the circumscribed circles of the two motors 16, 25.

In the above configuration, however, as can be understood from FIG. 1 etc. of Patent Document 1, the inverter device significantly protrudes upward and laterally (toward the front of the vehicle) from the outer edge of a case accommodating components of the drive device. Accordingly, in order to mount the drive device of Patent Document 1 on a chassis of, e.g., a conventional vehicle that is driven by an internal combustion engine (so-called engine vehicle), it is required to change the positions, shapes, etc. of other parts that are placed around the mounting space, which increases manufacturing cost.

RELATED ART DOCUMENT

Patent Document

[Patent documents 1] Japanese Patent Application Publication No. 2001-354040 (JP 2001-354040 A)

SUMMARY

Problem to be Solved

It is therefore desired to reduce the size of the overall outer shape of a vehicle drive device including an inverter device so that the entire vehicle drive device can be accommodated in a mounting space having a predetermined size.

Means for Solving the Problem

A vehicle drive device according an exemplary embodiment includes: an input member that is drivingly coupled to an internal combustion engine; a plurality of output members that are respectively drivingly coupled to a plurality of wheels; a rotating electrical machine; a differential gear unit that distributes to the plurality of output members a driving force transmitted from the rotating electrical machine side; and an inverter device that is connected to the rotating electrical machine, characterized in that the input member and the rotating electrical machine are arranged side by side in an axial direction so that a first axis serves as a central axis of rotation thereof, the differential gear unit is placed so that a second axis as a separate axis parallel to the first axis serves as an axis of rotation thereof, and at least a part of the inverter device is located so as to overlap the differential gear unit as viewed in a radial direction, and at least a part of the inverter device is located between a second reference line as an imaginary straight line that extends perpendicularly to a first reference line as an imaginary straight line passing through the first axis and the second axis and that passes through the first axis and a third reference line as an imaginary straight line that extends perpendicularly to the first reference line and that passes the second axis, as viewed in the axial direction.

As used herein, the expression "drivingly coupled" refers to the state where two rotating elements are coupled together so as to be able to transmit a driving force (synonymous with torque) therebetween. This concept includes the state where the two rotating elements are coupled together so as to rotate together, and the state where the two rotating elements are coupled together so as to be able to transmit a driving force therebetween via one or more transmission members. Such transmission members include various members that transmit rotation at the same speed or a shifted speed (a shaft, a gear mechanism, a belt, etc.). Such transmission members may include an engagement device that selectively transmits rotation and a driving force (a friction engagement device, a meshing engagement device, etc.)

The term "rotating electrical machine" is used as a concept including all of a motor (electric motor), a generator (electric generator), and a motor-generator that functions as both a motor and a generator as necessary.

Regarding arrangement of two members, the expression "overlap as viewed in a certain direction" means that when an imaginary straight line parallel to the viewing direction is moved in each direction perpendicular to the imaginary straight line, a region where the imaginary straight line crosses both of the two members is present at least a part of the range where the imaginary straight line is moved.

According to this characteristic configuration, the components (mainly the rotating electrical machine and the differential gear unit) that are arranged on the two imaginary axes located at different positions from each other as viewed in the axial direction can be arranged so as to partially overlap each other as viewed in the radial direction. Accordingly, these components can be arranged in a compact manner in the axial direction as compared to the case where, e.g., the components are arranged side by side on a single imaginary axis. In this case, since at least a part of the inverter device is located so as to overlap the differential gear unit as viewed in the radial direction, the vehicle drive device including the inverter device can be placed in a compact manner in the axial direction. Moreover, since at least a part of the inverter device is located in a region between the second reference line and the third reference line as viewed in the axial direction. Accordingly, the overall size of the device in a direction parallel to the first reference line can be reduced as compared to the case where the entire inverter device is located outside the region. The overall outer shape of the vehicle drive device including the inverter device can thus be reduced in size.

It is preferable that the vehicle drive device further include: a speed change mechanism having a shift output gear; a gear mechanism; and a case that accommodates the rotating electrical machine, the speed change mechanism, the gear mechanism, and the differential gear unit, the case have a bonding surface that is bonded to the internal combustion engine, the gear mechanism have a first gear that meshes with the shift output gear and a second gear that meshes with a differential input gear of the differential gear unit and that has a smaller diameter than the first gear, and the gear mechanism be placed so that a third axis as a separate axis parallel to the first axis and the second axis serves as an axis of rotation thereof and so that the second gear is located on the bonding surface side in the axial direction with respect to the first gear, and the inverter device be located so that the inverter device fits between the bonding surface and the first gear in the axial direction and so that at least a part of the inverter device overlaps the first gear as viewed in the axial direction.

According to this configuration, the components including the speed change mechanism and the gear mechanism, which are arranged on the three imaginary axes located at different positions from each other as viewed in the axial direction, can be generally arranged in a compact manner. In this case, an annular space having a size according to at least the difference between the outer diameter of the first gear and the outer diameter of the second gear is formed at a position that is located radially outward of the second gear placed on the bonding surface side (internal combustion engine side) with respect to the first gear and having a relatively small diameter, and that overlaps the first gear as viewed in the axial direction. An outer edge of the inverter device can be located closer to the center of the third axis by placing the inverter device by using a part of this annular space so that the inverter device fits between the bonding surface of the case and the first gear in the axial direction and so that the inverter device has a portion that overlaps the first gear as viewed in the axial direction. Accordingly, the overall outer shape of the vehicle drive device including the inverter device can further be reduced in size.

It is preferable that at least a part of the inverter device be located so as to overlap the gear mechanism as viewed in the radial direction.

According to this configuration, the annular space can be effectively used. Moreover, by increasing the range in which the inverter device and the gear mechanism overlap each other in the axial direction as viewed in the radial direction, the outer edge of the inverter device can be located even closer to the center of the third axis in the case where the inverter device has a fixed capacity. Accordingly, the overall outer shape of the vehicle drive device including the inverter device can further be reduced in size.

It is preferable that in a vehicle-mounted state, the third axis be located between the first axis and the second axis in a horizontal direction and vertically above the first axis and the second axis, as viewed in the axial direction, and the entire inverter device be located so as to fit between a fourth reference line as an imaginary straight line passing through the first axis and a fifth reference line as an imaginary vertical tangent line tangential to a circumscribed circle of the differential input gear, as viewed in the axial direction.

According to this configuration, in the state where the vehicle drive device is mounted on the vehicle, the rotating electrical machine, the speed change mechanism, and the differential gear unit which have relatively heavy weight can be placed vertically below the gear mechanism. This can improve stability during traveling of the vehicle as the center of gravity is lowered. Since the inverter device is located so that the entire inverter device fits between the fourth reference line and the fifth reference line as viewed in the axial direction, an increase in overall horizontal dimension of the vehicle drive device including the inverter device as viewed in the axial direction can be prevented.

It is preferable that at least a part of the inverter device be located between the bonding surface and the second gear in the axial direction so as to overlap the second gear as viewed in the axial direction.

According to the above configuration, since at least a part of the inverter device is located radially inward of a circumscribed circle of the second gear, the outer edge of the inverter device can be located even closer to the center of the third axis. Accordingly, the overall outer shape of the vehicle drive device including the inverter device can further be reduced in size.

It is preferable that the gear mechanism have a shaft member that couples the first gear and the second gear, and at least a part of the inverter device be located between the bonding surface and the shaft member in the axial direction so as to overlap the shaft member as viewed in the axial direction.

According to this configuration, since at least a part of the inverter device is located radially inward of an outer peripheral surface of the shaft member that often has a smaller diameter than the second gear, the outer edge of the inverter device can be located even closer to the center of the third axis. Accordingly, the overall outer shape of the vehicle drive device including the inverter device can further be reduced in size.

It is preferable that the vehicle drive device further include: a third gear formed in one of the gear mechanism and the speed change mechanism; and a lock mechanism that restricts rotation of the wheels in a state where the lock mechanism meshes with the third gear, and permits rotation of the wheels in a state where the lock mechanism is released from the meshing state with the third gear, wherein the entire inverter device be located between the bonding surface and the lock mechanism in the axial direction.

According to this configuration, the lock mechanism that selectively meshes with the third gear formed in the gear mechanism or the speed change mechanism can switch between the state where rotation of the wheels is restricted to force the vehicle to stop and the state where rotation of the wheels is permitted to allow the vehicle to run. Moreover, interference between the lock mechanism and the inverter device can be avoided even when such a lock mechanism is provided between the bonding surface and the first gear in the axial direction.

It is preferable that at least a part of the inverter device be located so as to overlap the rotating electrical machine as viewed in the radial direction.

According to this configuration, the rotating electrical machine and the inverter device can be electrically connected together with a short path length. Moreover, the position where a connection terminal of at least one of the rotating electrical machine and the inverter device is to be provided can be determined with great flexibility, and the connection terminal can be easily provided at an intended position that is determined according to the situation.

BEST MODES

An embodiment of a vehicle drive device according to an exemplary embodiment will be described with reference to the accompanying drawings. A vehicle drive device 1 according to the present embodiment is a vehicle drive device (hybrid vehicle drive device) that drives a vehicle (hybrid vehicle) including both an internal combustion engine E and a rotating electrical machine MG as driving force sources of wheels W. Specifically, the vehicle drive device 1 is configured as a drive device for single-motor parallel hybrid vehicles. In the following description, the terms regarding the direction, position, etc. of each member are used as a concept including an acceptable margin for manufacturing error. The direction of each member represents the direction of that member in the assembled state of the vehicle drive device 1.

1. General Configuration of Vehicle Drive Device

Figure 1:
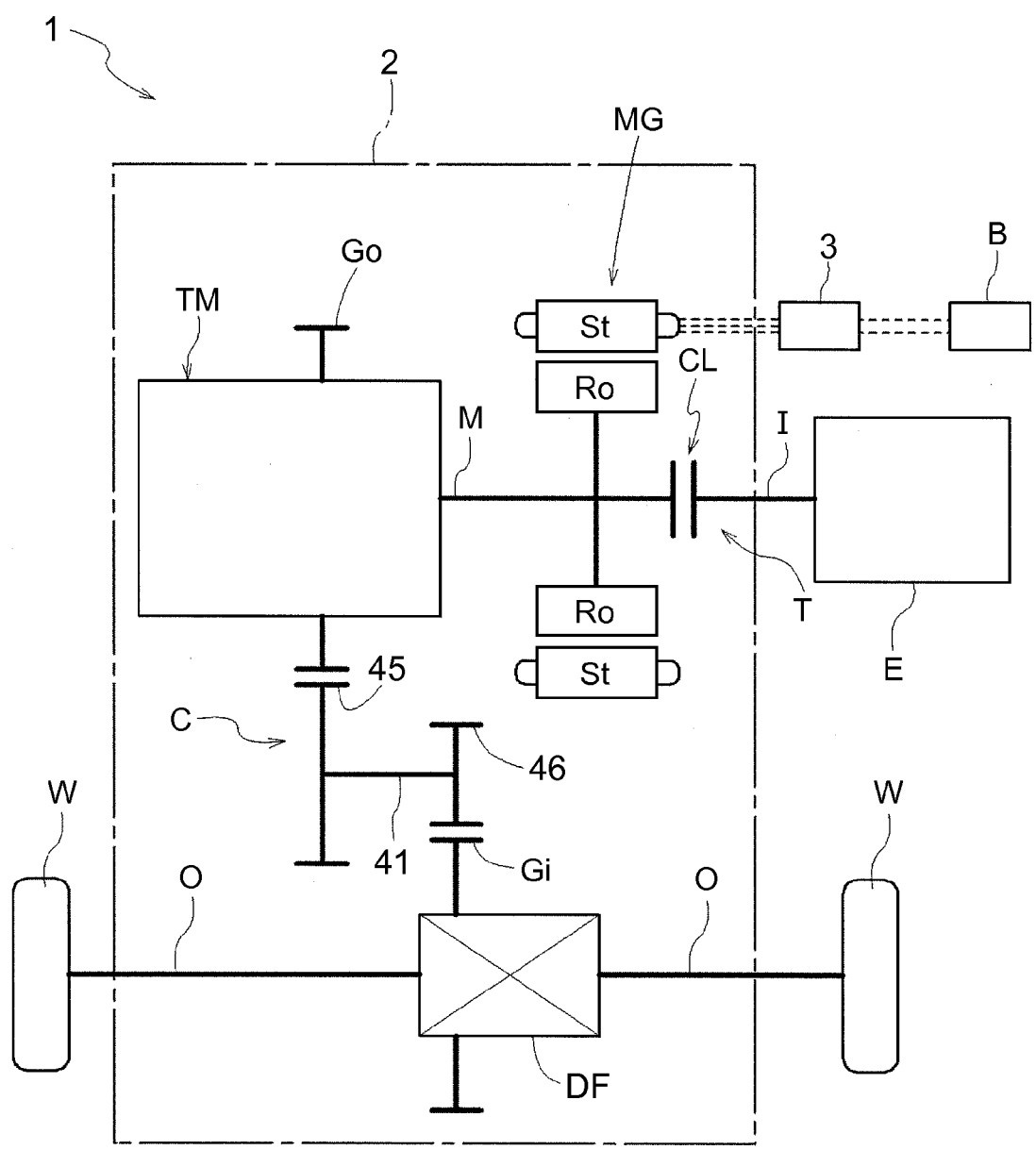
FIG. 1 is a schematic diagram showing a general configuration of a vehicle drive device according to an embodiment
Figure 2:
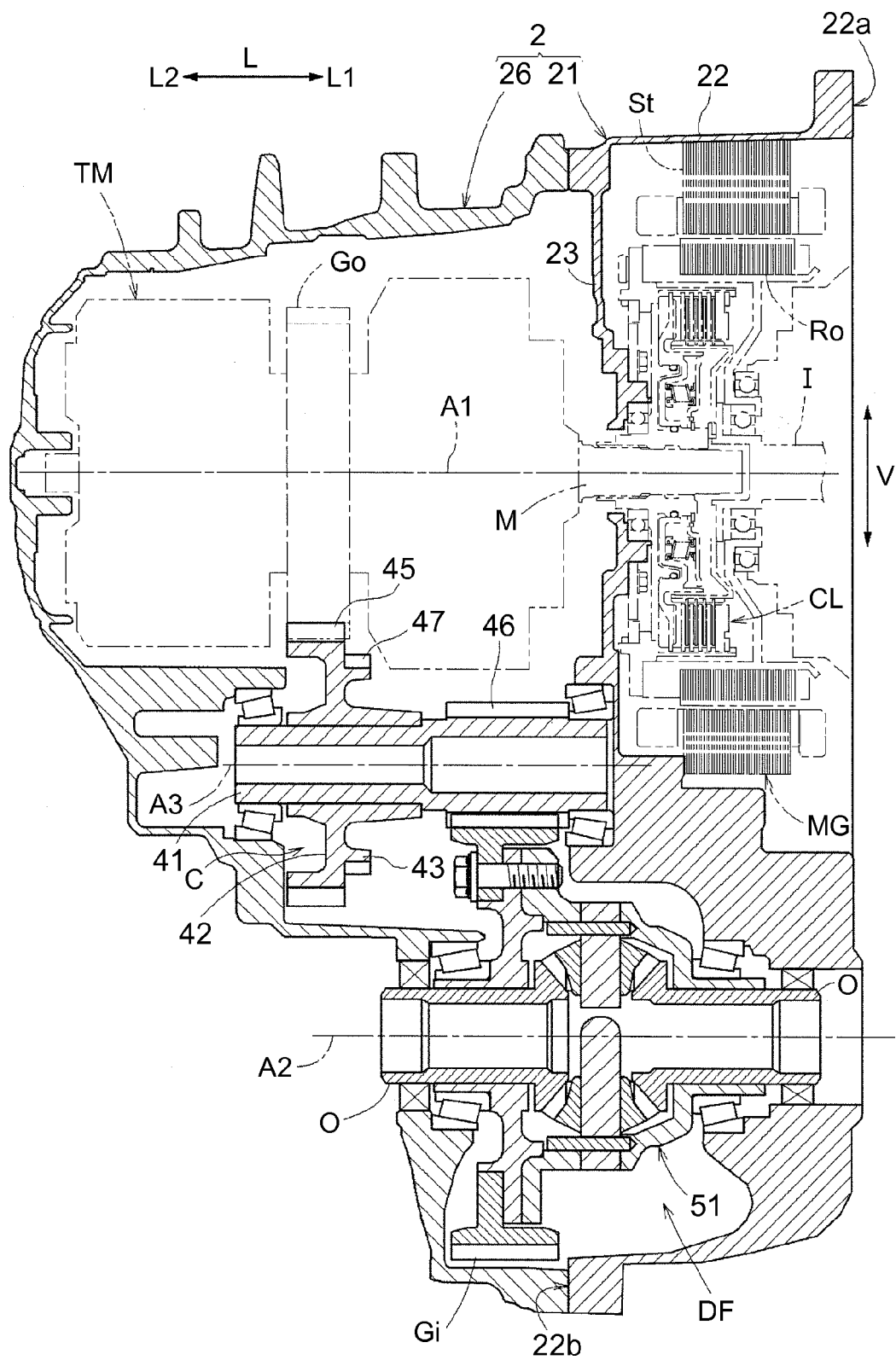
FIG. 2 is a developed sectional view of the vehicle drive device.

The general configuration of the vehicle drive device 1 according to the present embodiment will be described. As shown in FIGS. 1 and 2, the vehicle drive device 1 includes an input shaft I that is drivingly coupled to an internal combustion engine E, a plurality of (in this example, two) output shafts O that are respectively drivingly coupled to a plurality of (in this example, two) wheels W, a rotating electrical machine MG, and a differential gear unit DF. In the present embodiment, the vehicle drive device 1 further includes an engagement device CL, a speed change mechanism TM, and a gear mechanism C. The engagement device CL, the rotating electrical machine MG, the speed change mechanism TM, the gear mechanism C, and the differential gear unit DF are provided in a power transmission path T connecting the input shaft I and the output shafts O. These elements are provided in this order from the input shaft I side. These elements are accommodated in a case (drive device case) 2. In the present embodiment, the input shaft I corresponds to the "input member," and the output shafts O correspond to the "output members."

As shown in FIG. 2, in the present embodiment, the input shaft I, the rotating electrical machine MG, and the speed change mechanism TM are arranged on a first axis A1. That is, the input shaft I, the rotating electrical machine MG, and the speed change mechanism TM are arranged side by side in the extending direction of the first axis A1 so that the first axis A1 as an imaginary axis serves as a central axis of rotation thereof. The differential gear unit DF is placed on a second axis A2. That is, the differential gear unit DF is placed along the extending direction of the second axis A2 so that the second axis A2 as an imaginary axis serves as a central axis of rotation thereof. The gear mechanism C is placed on a third axis A3. That is, the gear mechanism C is placed along the extending direction of the third axis A3 so that the third axis A3 as an imaginary axis serves as a central axis of rotation thereof. These three axes A1, A2, A3 are arranged parallel to each other. In the present embodiment, the common extending direction of the three axes A1, A2, A3 is defined as the "axial direction L." The direction relatively toward the input shaft I side (right side in FIG. 2) which is one side of the axial direction L is defined as the "axial first direction L1," and the direction relatively toward the speed change mechanism TM side (left side in FIG. 2) which is the other side of the axial direction L is defined as the "axial second direction L2."

Figure 3:
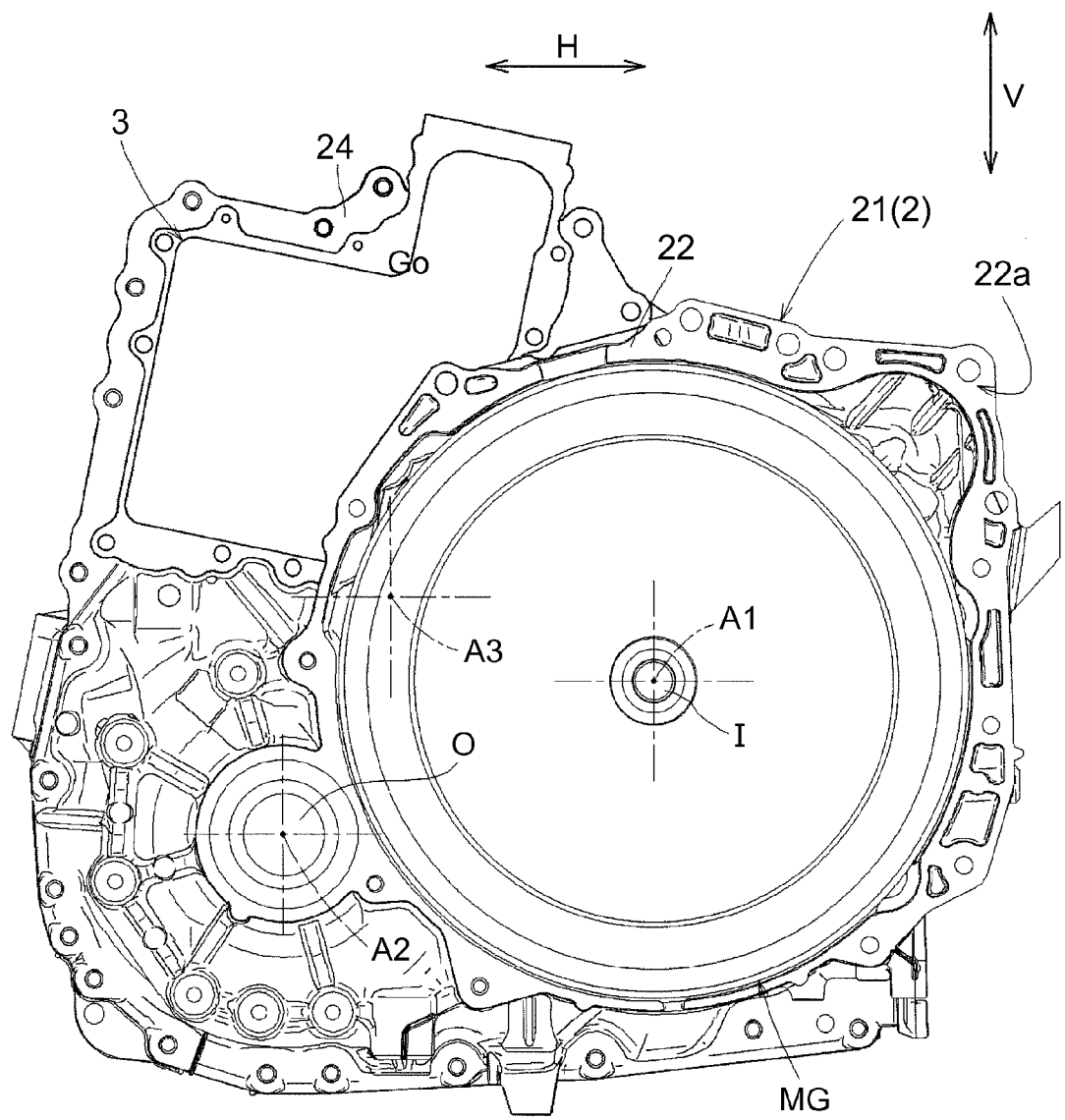
FIG. 3 is a side view of the vehicle drive device as viewed in an axial direction.

As shown in FIG. 3, the first axis A1, the second axis A2, and the third axis A3 as three separate axes are arranged at different positions as viewed in the axial direction L. In the present embodiment, the first axis A1, the second axis A2, and the third axis A3 are arranged so as to be located at the vertices of a triangle (in this example, an obtuse triangle) as viewed in the axial direction L. In the present embodiment, in a vehicle-mounted state (the state where the vehicle drive device 1 is mounted on the vehicle), the second axis A2 is located vertically below the first axis A1 (below the first axis A1 in a vertical direction V), and the first axis A1 and the second axis A2 are located at different positions in a horizontal direction H from each other as viewed in the axial direction L. In this example, in the vehicle-mounted state, the first axis A1 is located on a relatively front side of the vehicle, and the second axis A2 is located on a relatively rear side of the vehicle. The third axis A3 is located between the first axis A1 and the second axis A2 in the horizontal direction H as viewed in the axial direction L and is located vertically above (above in the vertical direction V) the first axis A1 and the second axis A2. The vehicle drive device 1 according to the present embodiment thus has a multi-axis configuration that is suitable for configurations in the case where the vehicle drive device 1 is mounted on, e.g., a front engine front drive (FF) vehicle.

As shown in FIG. 1, the input shaft (drive device input shaft) I is drivingly coupled to the internal combustion engine E. The internal combustion engine E is a motor (gasoline engine, diesel engine, etc.) that is driven by fuel combustion inside the engine to output power. In the present embodiment, the input shaft I is drivingly coupled to an output shaft (crankshaft etc.) of the internal combustion engine E.

The engagement device CL is provided between the input shaft I and the rotating electrical machine MG in the power transmission path T. The engagement device CL selectively drivingly couples the input shaft I (internal combustion engine E) to the rotating electrical machine MG. This engagement device CL functions as an internal combustion engine cut-off engagement device that disconnects the internal combustion engine E from the wheels W. In the present embodiment, the engagement device CL is configured as a hydraulically driven friction engaging device. The engagement device CL may be an electromagnetically driven friction engagement device, a meshing engagement device, etc.

The rotating electrical machine MG has a stator St fixed to the case 2, and a rotor Ro rotatably supported radially inward of the stator St (see also FIG. 2). The rotating electrical machine MG can function as a motor (electric motor) that is supplied with electric power to generate power and as a generator (electric generator) that is supplied with power to generate electric power. The rotating electrical machine MG is electrically connected to an electricity storage device B (battery, capacitor, etc.) via an inverter device 3. The rotating electrical machine MG is supplied with electric power from the electricity storage device B to perform power running, or supplies electric power generated by the torque of the internal combustion engine E or the inertia force of the vehicle to the electricity storage device B to store the electric power therein. The rotor Ro of the rotating electrical machine MG is drivingly coupled to an intermediate shaft M so as to rotate together therewith. This intermediate shaft M serves as an input shaft (shift input shaft) of the speed change mechanism TM.

In the present embodiment, the speed change mechanism TM is an automatic stepped speed change mechanism having a plurality of switchable shift speeds with different speed ratios. An automatic stepless speed change mechanism capable of steplessly changing the speed ratio, a manual stepped speed change mechanism having a plurality of switchable shift speeds with different speed ratios, a fixed speed change mechanism having a single shift speed with a fixed speed ratio (including "1"), etc. may be used as the speed change mechanism TM. The speed change mechanism TM performs shifting and torque conversion of rotation and torque that are input to the intermediate shaft M, according to a speed ratio at each point, thereby transmitting the resultant rotation and torque to a shift output gear Go of the speed change mechanism TM.

The shift output gear Go is drivingly coupled to the gear mechanism C. As shown in FIGS. 1 and 2, the gear mechanism C has a shaft member 41, a first gear 45, and a second gear 46. The shaft member 41 is a columnar or cylindrical member formed so as to couple the first gear 45 to the second gear 46. As shown in FIG. 2, an annular disc-shaped rim member 42 having a cylindrical portion that is engaged with the shaft member 41 is coupled to an outer peripheral portion of the shaft member 41. The shaft member 41 and the rim member 42 are spline coupled so as to rotate together. The first gear 45 is formed in the outer peripheral portion of the rim member 42. The first gear 45 meshes with the shift output gear Go of the speed change mechanism TM. The rim member 42 has a cylindrical protruding portion 43 protruding from the side surface of the rim member 42 on the axial first direction L1 side to the axial first direction L1 side. A third gear 47 is formed in an outer peripheral portion of the cylindrical protruding portion 43.

The second gear 46 is formed in the outer peripheral portion of the shaft member 41 at a different position in the axial direction L from the position where the rim member 42 is coupled. In the present embodiment, the second gear 46 is placed on the axial first direction L1 side (internal combustion engine E side) with respect to the first gear 45 and the third gear 47. The third gear 47 has a smaller diameter than the first gear 45, and the second gear 46 has a smaller diameter than the first gear 45 and the third gear 47. The second gear 46 meshes with a differential input gear Gi of the differential gear unit DF.

The differential gear unit (output differential gear unit) DF is drivingly coupled to the wheels W via the output shafts O. The differential gear unit DF has the differential input gear Gi and a differential body part 51 (body part of the differential gear unit DF) coupled to the differential input gear Gi. The differential body part 51 includes a plurality of bevel gears meshing with each other and a differential case accommodating the plurality of bevel gears, and plays a central role of a differential mechanism. In the present embodiment, the differential body part 51 is placed on the axial first direction L1 side (internal combustion engine E side) with respect to the differential input gear Gi in view of the respective sizes of the internal combustion engine E and the vehicle drive device 1 in order that the differential body part 51 is placed as close to the central part of the vehicle in a lateral direction as possible. The differential gear unit DF distributes and transmits rotation and torque, which are input from the rotating electrical machine MG side to the differential input gear Gi via the speed change mechanism TM and the gear mechanism C, to the right and left two output shafts O (i.e., the right and left two wheels W) by the differential body part 51.

Figure 6:
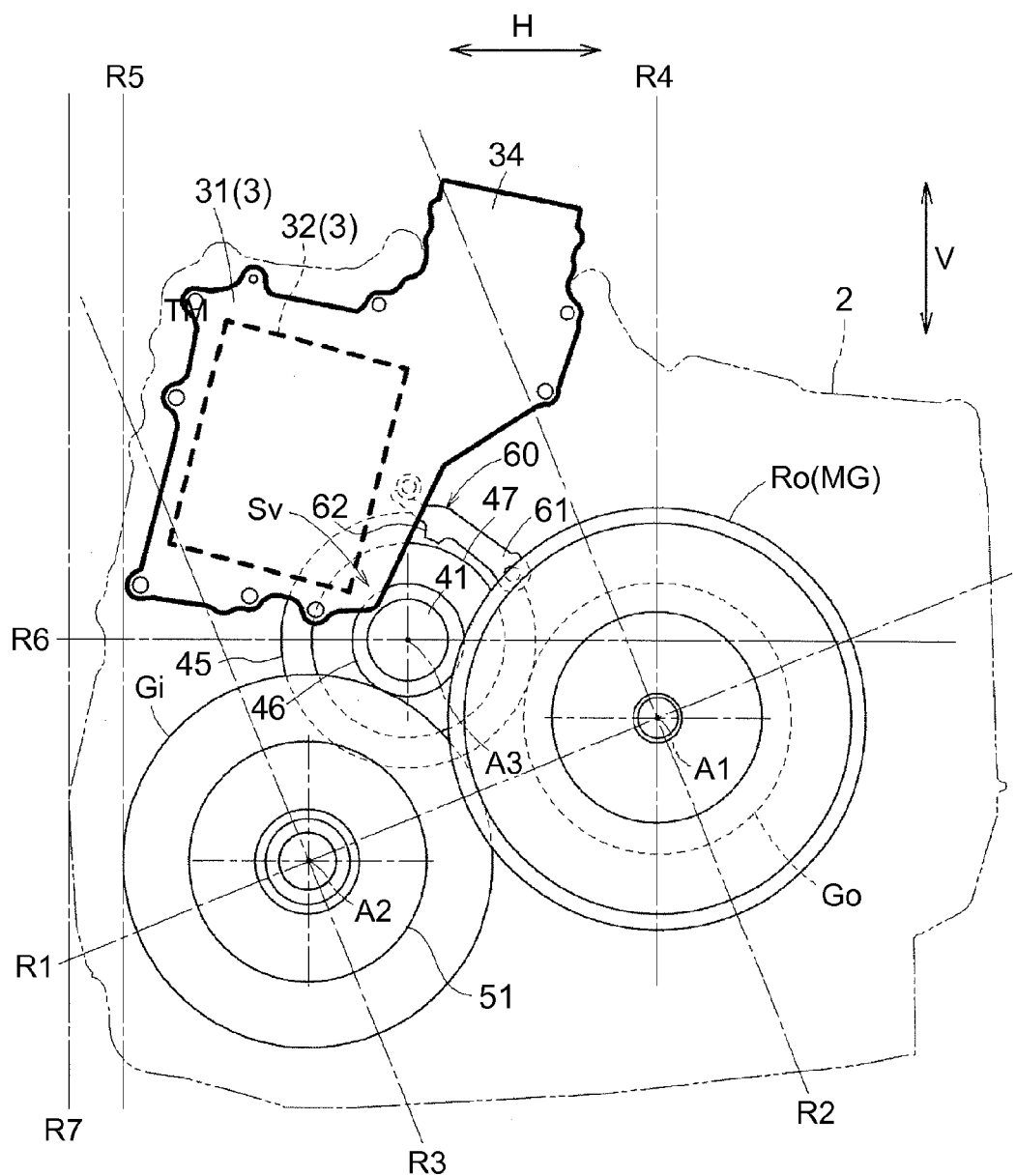
FIG. 6 is a schematic diagram showing the positional relation of components as viewed in the axial direction.

As shown in FIG. 6, the vehicle drive device 1 includes a lock mechanism 60. The lock mechanism 60 includes a lock member 61 having an engagement pawl 62. The lock member 61 swings about a predetermined fulcrum, and can be in the state where the engagement pawl 62 meshes with the third gear 47 and the state where the engagement pawl 62 does not mesh with the third gear 47. Regarding the third gear 47, only the circumscribed circle thereof is shown in FIG. 6 for simplification (the same applies to the other gears). The lock mechanism 60 restricts rotation of the wheels W (forces the vehicle to stop) in the state where the engagement pawl 62 meshes with the third gear 47, and permits rotation of the wheels W (allows the vehicle to move) in the state where the engagement pawl 62 is released from the meshing state with the third gear 47. With the wheels W being unlocked by the lock mechanism 60, the vehicle drive device 1 can transmit torque of one or both of the internal combustion engine E and the rotating electrical machine MG to the wheels W to move the vehicle.

2. Structure that Fixes Inverter Device to Case

Figure 4:
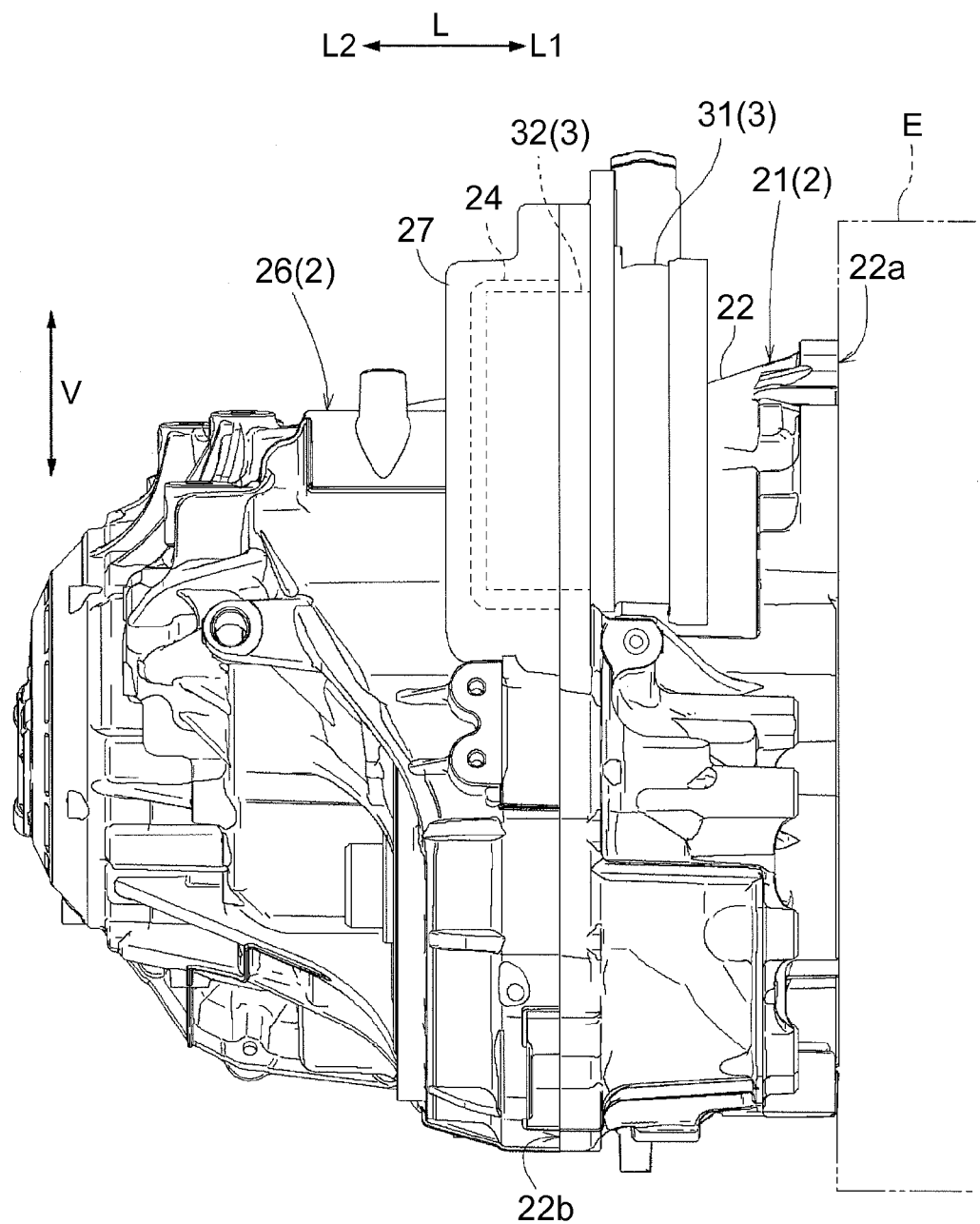
FIG. 4 is a side view of the vehicle drive device as viewed in a direction perpendicular to the axial direction.

The structure that fixes the inverter device 3 to the case 2 in the vehicle drive device 1 according to the present embodiment will be described. As shown in FIGS. 2 and 4, in the present embodiment, the case 2 is divided in the axial direction L so as to have a first case portion 21 and a second case portion 26. The first case portion 21 is a case portion mainly forming a space that accommodates the rotating electrical machine MG and the engagement device CL. The second case portion 26 is a case portion mainly forming a space that accommodates the speed change mechanism TM and the gear mechanism C. In the present embodiment, a space accommodating the differential gear unit DF is formed so as to extend in both the first case portion 21 and the second case portion 26. The second case portion 26 is bonded to the first case portion 21 from the axial second direction L2 side.

As shown in FIGS. 2 to 4, the first case portion 21 has a peripheral wall 22 that covers the outer periphery of the rotating electrical machine MG. The rotating electrical machine MG is accommodated inward of the peripheral wall 22 in a radial direction of the first axis A1. The engagement device CL is placed inward of the rotating electrical machine MG in the radial direction of the first axis A1. The rotating electrical machine MG and the engagement device CL are arranged so as to overlap each other as viewed in the radial direction of the first axis A1. In the present embodiment, the internal combustion engine E is bonded to the end face of the peripheral wall 22 on the axial first direction L1 side. That is, the peripheral wall 22 has, at its end on the axial first direction L1 side, a first bonding surface 22a that is bonded to the internal combustion engine E so as to be fixed thereto. The second case portion 26 is bonded to the end face of the peripheral wall 22 on the axial second direction L2 side. That is, the peripheral wall 22 has, at its end on the axial second direction L2 side, a second bonding surface 22b that is bonded to the second case portion 26 so as to be fixed thereto. In the present embodiment, the first bonding surface 22a corresponds to the "bonding surface."

The first case portion 21 has, at its end on the axial second direction L2 side, a partition wall 23 extending in the radial direction from the peripheral wall 22. This partition wall 23 is placed between the rotating electrical machine MG and the speed change mechanism TM in the axial direction L to separate the space accommodating the rotating electrical machine MG etc. from the space accommodating the speed change mechanism TM etc. in the axial direction L. As shown in FIG. 3, the first case portion 21 has a first protruding wall 24 formed so as to protrude outward from the peripheral wall 22 in the radial direction of the first axis A1. In this example, the first protruding wall 24 is formed so as to protrude upward in the vertical direction V and toward the third axis A3 side (rear side of the vehicle) in the horizontal direction H from the first axis A1 as viewed in the axial direction L. This first protruding wall 24 is placed so as to overlap a second protruding wall 27 of the second case portion 26 as viewed in the axial direction L (see FIG. 4).

As shown in FIG. 4, each of the first protruding wall 24 and the second protruding wall 27 is formed as a thick wall occupying a predetermined range in the axial direction L. In the present embodiment, the range where the first protruding wall 24 occupies in the axial direction L includes a region located on the axial second direction L2 side with respect to the second bonding surface 22b. The first protruding wall 24 is thus placed so as to overlap a region of the second case portion 26 on the axial first direction L1 side (including a part of the second protruding wall 27) as viewed in the radial direction of the first axis A1. Each of the first protruding wall 24 and the second protruding wall 27 is formed in a trough shape that opens toward the axial first direction L1 side. In the present embodiment, the first protruding wall 24 is accommodated in an internal space of the second protruding wall 27.

In the present embodiment, the inverter device 3 is attached to the case 2. The inverter device 3 is a device that is electrically connected to the rotating electrical machine MG and the electricity storage device B to adjust transfer (transmission and reception) of electric power between the electricity storage device B and the rotating electrical machine MG according to a control command from a control device (control device for the drive device, not shown). In the present embodiment, the inverter device 3 carries out power conversion between direct current (DC) power that is transmitted to and received from the electricity storage device B and alternating current (AC) power that is transmitted to and received from the rotating electrical machine MG. The inverter device 3 thus includes a DC-AC conversion section that carries out conversion between the DC power and the AC power. As well known in the art, a switching element for DC-AC conversion (IGBT, MOSFET, etc.), a rectifying element (diode etc.), a smoothing capacitor, etc. are included in the DC-AC conversion section. In the present embodiment, the inverter device 3 has a power section 31 formed by integrating the switching element and the rectifying element with a substrate etc., and a capacitor section 32 formed by one or more capacitors (see also FIG. 5). The inverter device 3 further has a connector section 34 accommodating a connection terminal that is electrically connected to the electricity storage device B. As shown in FIG. 6, the connector section 34 is formed so as to protrude vertically upward from a corner of the power section 31 that is placed so as to overlap the capacitor section 32 as viewed in the axial direction L.

Figure 5:
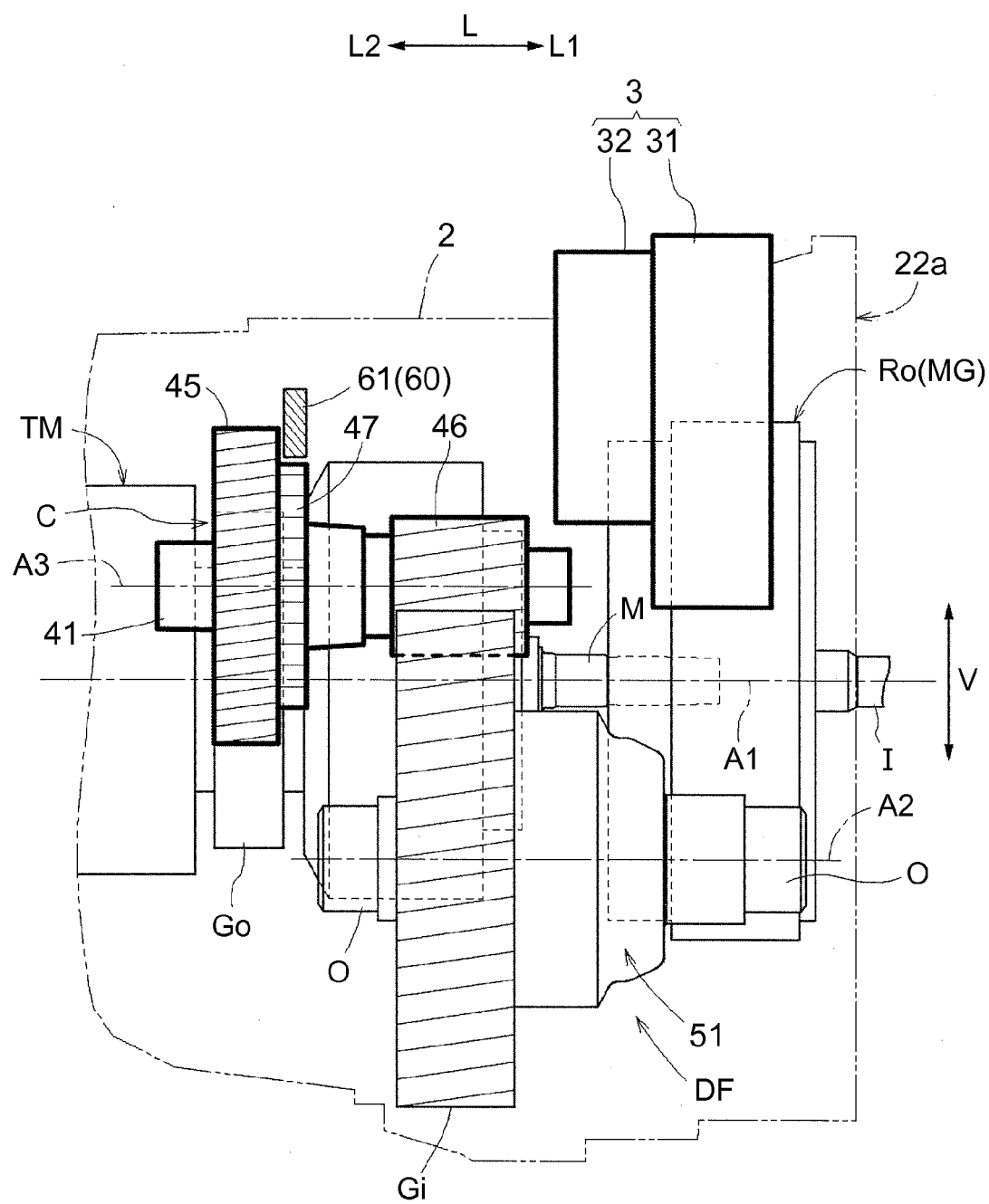
FIG. 5 is a schematic diagram showing the positional relation of components as viewed in a direction perpendicular to the axial direction.

As shown in FIG. 5, in the present embodiment, each of the power section 31 and the capacitor section 32 has a flat shape in the axial direction L as viewed in such a direction of the horizontal direction H that is perpendicular to the axial direction L (hereinafter referred to as the "specific horizontal direction"). Each of the power section 31 and the capacitor section 32 is formed in a rectangular shape having a larger dimension in the vertical direction than in the axial direction as viewed in the specific horizontal direction. In the present embodiment, the power section 31 is a part that is larger than the capacitor section 32 regarding the size in the vertical direction V. In this example, the range where the power section 31 occupies in the vertical direction V completely contains the range where the capacitor section 32 occupies in the vertical direction V. The power section 31 and the capacitor section 32 are coupled together such that the power section 31 is located on the axial first direction L1 side with respect to the capacitor section 32. The inverter device 3 is thus generally formed so that its size in the vertical direction V increases in stages toward the axial first direction L1 side as viewed in the specific horizontal direction.

In the present embodiment, as shown in FIG. 4, the inverter device 3 is attached to the first case portion 21 placed on the axial first direction L1 side (internal combustion engine E side) out of the two case portions 21, 22 of the case 2. As described above, the first case portion 21 has the first protruding wall 24 that is formed so as to protrude from the peripheral wall 22 and that is thick in the axial direction L, and the first protruding wall 24 is formed in a trough shape that opens toward the axial first direction L1 side. At least a part of the inverter device 3 is accommodated in an internal space of the first protruding wall 24 formed in the trough shape. In the present embodiment, the capacitor section 32 of the inverter device 3 is accommodated in the internal space of the first protruding wall 24 (shown by broken line in FIG. 4). The power section 31 is not accommodated therein. The entire inverter device 3 including the power section 31 is thus attached to the first case portion 21 such that only the capacitor section 32 is accommodated in the internal space of the first protruding wall 24. The inverter device 3 is attached from the axial first direction L1 side.

3. Positional Relation Between Inverter Device and Each Component

The positional relation between the inverter device 3 and each component in the vehicle drive device 1 according to the present embodiment will be described. As shown in FIG. 5, the inverter device 3 is placed on the axial second direction L2 side (opposite side from the internal combustion engine E) with respect to at least the first bonding surface 22a of the case 2 (peripheral wall 22). In the present embodiment, as shown in FIG. 4, the inverter device 3 is not placed in a predetermined range (in this example, about a half) that is on the first bonding surface 22a side of the range where the first case portion 21 occupies in the axial direction L, and is placed on the axial second direction L2 side with respect to the predetermined range. This can facilitate operation of coupling the vehicle drive device 1 to the internal combustion engine E via the first bonding surface 22a. For example, the coupling operation can be performed without using a special tool and/or accidental damage to the inverter device 3 during the coupling operation can be suppressed.

In the present embodiment, as can be understood from FIG. 6, a valley-shaped space Sv having a V-shape (rounded V-shape) as viewed in the axial direction L is formed outward of the rotating electrical machine MG in the radial direction of the first axis A1 and outward of the differential body part 51 in the radial direction of the second axis A2. The inverter device 3 is placed in this valley-shaped space Sv. As shown in FIG. 5, at least a part of the inverter device 3 is located so as to overlap the rotating electrical machine MG as viewed in the radial direction of the first axis A1. In this example, a part of the capacitor section 32 on the axial first direction L1 side and the entire power section 31 of the inverter device 3 are located so as to overlap the rotating electrical machine MG. At least a part of the inverter device 3 is located so as to overlap the differential gear unit DF as viewed in the radial direction of the second axis A2. In this example, the entire capacitor section 32 and a part of the power section 31 on the axial second direction L2 side are located so as to overlap the differential body part 51.

At least a part of the gear mechanism C on the third axis A3 that is located between the first axis A1 and the second axis A2 in the horizontal direction H and vertically above the first axis A1 and the second axis A2 as viewed in the axial direction L is similarly placed in the valley-shaped space Sv. In the present embodiment, the positional relation between the inverter device 3 and the gear mechanism C in the valley-shaped space Sv is therefore adjusted as described below.

As shown in FIG. 5, the inverter device 3 is placed so as to fit between the first bonding surface 22a and the first gear 45 in the axial direction L. The entire inverter device 3 is placed on the axial second direction L2 side with respect to the first bonding surface 22a and on the axial first direction L1 side with respect to the first gear 45. This avoids mutual interference between the first gear 45 and the inverter device 3 even if the inverter device 3 and the gear mechanism C are placed in the same valley-shaped space Sv. As shown in FIG. 6, a part on the lower end side of the power section 31 and a part on the lower end side of the capacitor section 32 of the inverter device 3 are located so as to overlap the first gear 45 as viewed in the axial direction L.

As shown in FIG. 5, the inverter device 3 is placed so as to fit between the first bonding surface 22a and the lock mechanism 60 (third gear 47) in the axial direction L. The entire inverter device 3 is placed on the axial second direction L2 side with respect to the first bonding surface 22a and on the axial first direction L1 side with respect to the lock mechanism 60 (third gear 47). In the present embodiment, since the third gear 47 is placed on the axial first direction L1 side with respect to the first gear 45, the lock mechanism 60 is also placed on the axial first direction L1 side with respect to the first gear 45 accordingly. The lock mechanism 60 including the lock member 61 having the engagement pawl 62 that meshes with the third gear 47 is also similarly placed in the valley-shaped space Sv. Thus, placing the inverter device 3 on the axial first direction L1 side with respect to the lock mechanism 60 (third gear 47) as described above avoids mutual interference between the inverter device 3 and the lock mechanism 60 (third gear 47). As shown in FIG. 6, the part on the lower end side of the power section 31 and the part on the lower end side of the capacitor section 32 of the inverter device 3 are located so as to overlap the third gear 47 as viewed in the axial direction L.

As shown in FIG. 5, the inverter device 3 is placed so as to fit between the first bonding surface 22a and the second gear 46 in the axial direction L. The entire inverter device 3 is placed on the axial second direction L2 side with respect to the first bonding surface 22a and on the axial first direction L1 side with respect to the second gear 46. This avoids mutual interference between the inverter device 3 and the differential input gear Gi of the differential gear unit DF which has a relatively large diameter and which meshes with the second gear 46. At least a part of the inverter device 3 is located so as to overlap the gear mechanism C as viewed in the radial direction of the third axis A3. In the present embodiment, a part of the capacitor section 32 of the inverter device 3 on the axial second direction L2 side is located so as to overlap a part of such a portion of the shaft member 41 of the gear mechanism C that is located on the axial first direction L1 side with respect to the second gear 46.

The remaining part of the inverter device 3 is placed between the first bonding surface 22a and the shaft member 41 in the axial direction L. In the present embodiment, the remaining part of the capacitor section 32 on the axial first direction L1 side and the power section 31 are placed on the axial second direction L2 side with respect to the first bonding surface 22a and on the axial first direction L1 side with respect to the shaft member 41. In this case, as shown in FIG. 6, the part on the lower end side of the power section 31 of the inverter device 3 is located so as to overlap the second gear 46 as viewed in the axial direction L. The power section 31 is placed in the range where the shaft member 41 occupies in the vertical direction V (i.e., has a portion located at the same height as the shaft member 41), but does not overlap the shaft member 41 as viewed in the axial direction L. The capacitor section 32 of the inverter device 3 is placed in the range where the second gear 46 occupies in the vertical direction V (i.e., has a portion located at the same height as the second gear 46), but does not overlap the second gear 46 and the shaft member 41 as viewed in the axial direction L.

An imaginary straight line passing through the first axis A1 and the second axis A2 as viewed in the axial direction L is herein defined as the "first reference line R1." An imaginary straight line extending perpendicularly to the first reference line R1 and passing through the first axis A1 is defined as the "second reference line R2." An imaginary straight line extending perpendicularly to the first reference line R1 and passing through the second axis A2 is defined as the "third reference line R3." An imaginary straight line passing through the first axis A1 and extending in the vertical direction V is defined as the "fourth reference line R4." An imaginary straight line being tangential to the circumscribed circle of the differential input gear Gi on the opposite side of the second axis A2 from the first axis A1 in the horizontal direction H and extending in the vertical direction V is defined as the "fifth reference line R5." An imaginary straight line passing through the third axis A3 and extending in the horizontal direction H is defined as the "sixth reference line R6."

The inverter device 3 is placed as described below with respect to the reference lines R1 to R6. As shown in FIG. 6, at least a part of the inverter device 3 is placed between the second reference line R2 and the third reference line R3 as viewed in the axial direction L. At least a part of the inverter device 3 is placed in the region surrounded by the second and third reference lines R2, R3 that are parallel to each other and the first reference line R1 that is perpendicular to the second and third reference lines R2, R3. In the present embodiment, most of the inverter device 3 excluding the connector section 34 and a corner on the lower end side of the power section 31 is placed in the region surrounded by the three reference lines R1, R2, R3. Substantially the entire capacitor section 32 is placed in this region.

The inverter device 3 is placed so that the entire inverter device 3 fits between the fourth reference line R4 and the fifth reference line R5 as viewed in the axial direction L. The inverter device 3 is placed so that the entire inverter device 3 is located vertically above the sixth reference line R6. The inverter device 3 is thus placed so that the entire inverter device 3 fits in the region surrounded by the fourth reference line R4 and the fifth and sixth reference lines R5, R6 perpendicular to the fourth reference line R4.

As shown in FIG. 5, the gear mechanism C formed so that its diameter decreases in stages toward the axial first direction L1 side and the inverter device 3 formed so that its size in the vertical direction V increases in stages toward the axial first direction L1 side are arranged in complementary positions as viewed in the specific horizontal direction. Specifically, as shown in FIGS. 5 and 6, the inverter device 3 is placed so that it fits between the first bonding surface 22a and the first gear 45 and the lock mechanism 60 in the axial direction L and so that at least a part of the inverter device 3 overlaps the first gear 45 as viewed in the axial direction L. Moreover, the power section 31 of the inverter device 3 is placed so that it fits between the first bonding surface 22a and the second gear 46 in the axial direction L and so that at least a part of the power section 31 overlaps the second gear 46 as viewed in the axial direction L. The outer edge of the inverter device 3 can thus be located closer to the center of the third axis A3 in the radial direction of the third axis A3, and the overall outer shape of the vehicle drive device 1 including the inverter device 3 can be reduced in size. This allows the vehicle drive device 1 to be mounted on a chassis of a conventional so-called engine vehicle without changing so much (preferably without changing at all) the positions, shapes, etc. of other parts that are placed around the mounting space for the vehicle drive device 1. This can suppress an increase in manufacturing cost of hybrid vehicles.

In the present embodiment, the inverter device 3 is placed in a complementary position with the differential gear unit DF formed so that its diameter decreases in stages toward the axial first direction L1 side, as viewed in the specific horizontal direction. Accordingly, a space having a proper size can be secured between the inverter device 3 and the gear mechanism C and the differential gear unit DF. The first protruding wall 24 (see FIG. 4) of the first case portion 21 is placed by using this space. With the capacitor section 32 being accommodated within the first protruding wall 24, the inverter device 3 is fixed to the outer side of the peripheral wall 22. The inverter device 3 can thus be isolated from oil that is present in the first case portion 21 (peripheral wall 22) and in the second case portion 26 for the purpose of lubrication, cooling, etc. of various members.

In the present embodiment, the inverter device 3 is placed so that at least a part of the inverter device 3 overlaps the rotating electrical machine MG as viewed in the radial direction of the first axis A1. Especially in this example, the inverter device 3 is placed so that the entire power section 31 of the inverter device 3 overlaps the rotating electrical machine MG. Unlike the capacitor section 32, the power section 31 is often typically provided with a connection terminal (not shown) that is electrically connected to the rotating electrical machine MG. Accordingly, the position where the connection terminal is to be provided can be determined with great flexibility by placing the inverter device 3 so that the power section 31 overlaps the rotating electrical machine MG as described above. The connection terminal can thus be easily provided at an appropriate position according to the arrangement configuration of each part. Moreover, wiring between the power section 31 and the rotating electrical machine MG can be easily simplified, and inductance can be reduced accordingly.

Moreover, in the present embodiment, the inverter device 3 is placed so that at least a part of the inverter device 3 is included in the region between the second reference line R2 and the third reference line R3 as viewed in the axial direction L. The inverter device 3 is placed so that the entire inverter device 3 fits in the region surrounded by the fourth reference line R4, the fifth reference line R5, and the sixth reference line R6. The overall outer shape of the vehicle drive device 1 including the inverter device 3 is also effectively reduced in size by using such a configuration. In this configuration, the inverter device 3 can be placed so as to overlap at least one of the rotating electrical machine MG and the speed change mechanism TM which have a relatively large diameter and heavy weight (in this example, only the rotating electrical machine MG) as viewed in the specific horizontal direction. Accordingly, in the case where the first axis A1 of the vehicle drive device 1 that is mounted on an FF vehicle is placed on the front side of the vehicle as in the present embodiment, the inverter device 3 can be shielded and protected to some degree by heavy parts even if a collision occurs while the vehicle is moving forward. This can reduce the possibility of failure etc. of the inverter device 3 when an accident occurs.

4. Other Embodiments

Lastly, other embodiments of the vehicle drive device according to the present invention will be described. Note that the configuration disclosed in each of the following embodiments may be applied in combination with the configurations disclosed in the other embodiments as long as no inconsistency arises.

Figure 7:
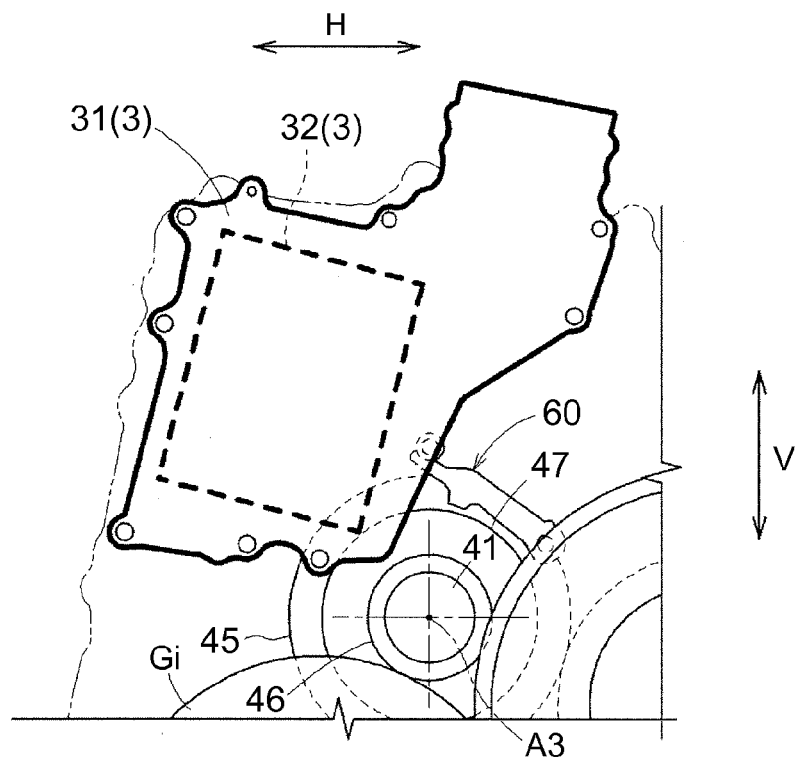
FIG. 7 is a schematic diagram showing another form of the positional relation of the components as viewed in the axial direction.

(1) The above embodiment is described with respect to an example in which a part of the inverter device 3 is located so as to overlap the second gear 46 as viewed in the axial direction L. However, embodiments of the present invention are not limited to this. For example, as shown in FIG. 7, the inverter device 3 may be placed so that the inverter device 3 does not overlap the second gear 46 and overlaps only at least one of the first gear 45 and the third gear 47 (in the illustrated example, both the first gear 45 and the third gear 47) as viewed in the axial direction L.

Figure 8:
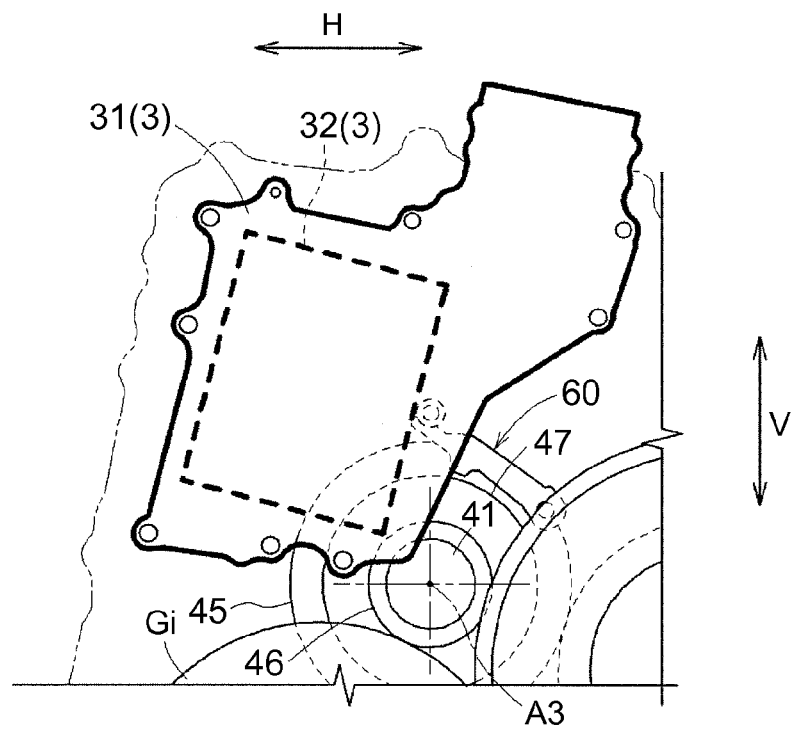
FIG. 8 is a schematic diagram showing still another form of the positional relation of the components as viewed in the axial direction.

(2) The above embodiment is described with respect to an example in which the inverter device 3 is placed so as not to overlap the shaft member 41 as viewed in the axial direction L. However, embodiments of the present invention are not limited to this. For example, as shown in FIG. 8, at least a part of the inverter device 3 may be located so as to overlap the shaft member 41 having a smaller diameter than the second gear 46 as viewed in the axial direction L. In the illustrated example, the inverter device 3 is placed so that only the power section 31 of the inverter device 3 overlaps the shaft member 41. However, the inverter device 3 may be placed so that the capacitor section 32 also overlaps the shaft member 41. In this case, the outer edge of the inverter device 3 can be located even closer to the center of the third axis A3, and the overall outer shape of the vehicle drive device 1 including the inverter device 3 can further be reduced in size.

Figure 9:
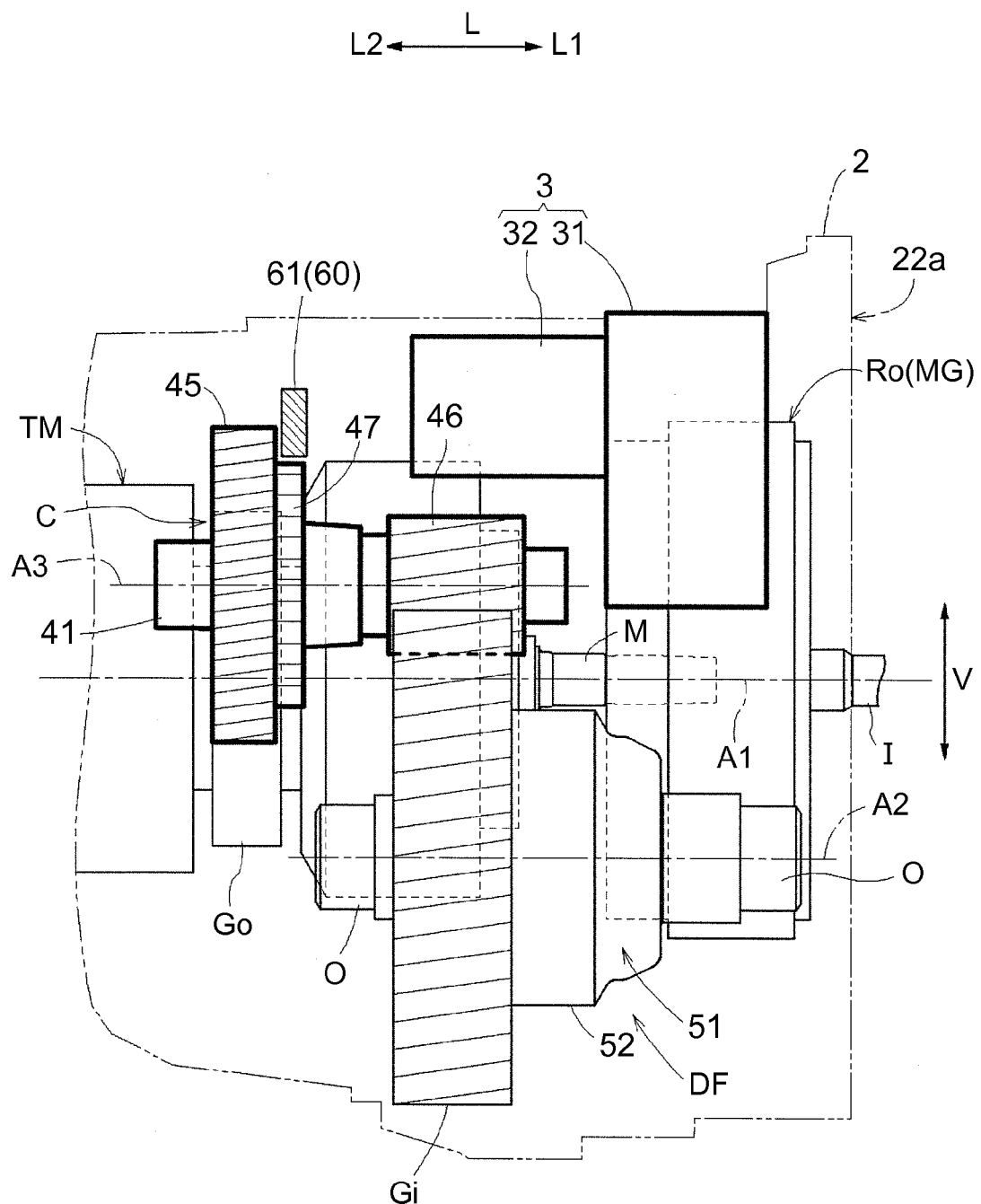
FIG. 9 is a schematic diagram showing a further form of the positional relation of the components as viewed in a direction perpendicular to the axial direction.

(3) The above embodiment is described with respect to an example in which a part of the inverter device 3 is located so as to overlap only a part of the shaft member 41 which is located on the axial first direction L1 side with respect to the second gear 46, as viewed in the radial direction of the third axis A3. However, embodiments of the present invention are not limited to this. For example, as shown in FIG. 9, at least a part of the inverter device 3 may be located so as to overlap the second gear 46 as well. At least a part of the inverter device 3 may be located so as to overlap a part of the shaft member 41 which is located on the axial second direction L2 side (first gear 45 side) with respect to the second gear 46 within such a range that the inverter device 3 does not interfere with the lock mechanism 60. This can increase the range in which the inverter device 3 overlaps the gear mechanism C in the axial direction L as viewed in the radial direction of the third axis A3. Accordingly, in the case where the inverter device 3 has a fixed capacity, the outer edge of the inverter device 3 can be located even closer to the center of the third axis A3, and the overall outer shape of the vehicle drive device 1 including the inverter device 3 can further be reduced in size. The inverter device 3 may be placed so as not to overlap the gear mechanism C as viewed in the radial direction of the third axis A3.

(4) The above embodiment is described with respect to an example in which a part of the inverter device 3 is located so as to overlap the rotating electrical machine MG as viewed in the radial direction of the first axis A1 and overlaps the differential body part 51 as viewed in the radial direction of the second axis A2. However, embodiments of the present invention are not limited to this. The inverter device 3 may be placed so as not to overlap at least one of the rotating electrical machine MG and the differential body part 51.

Figure 10:
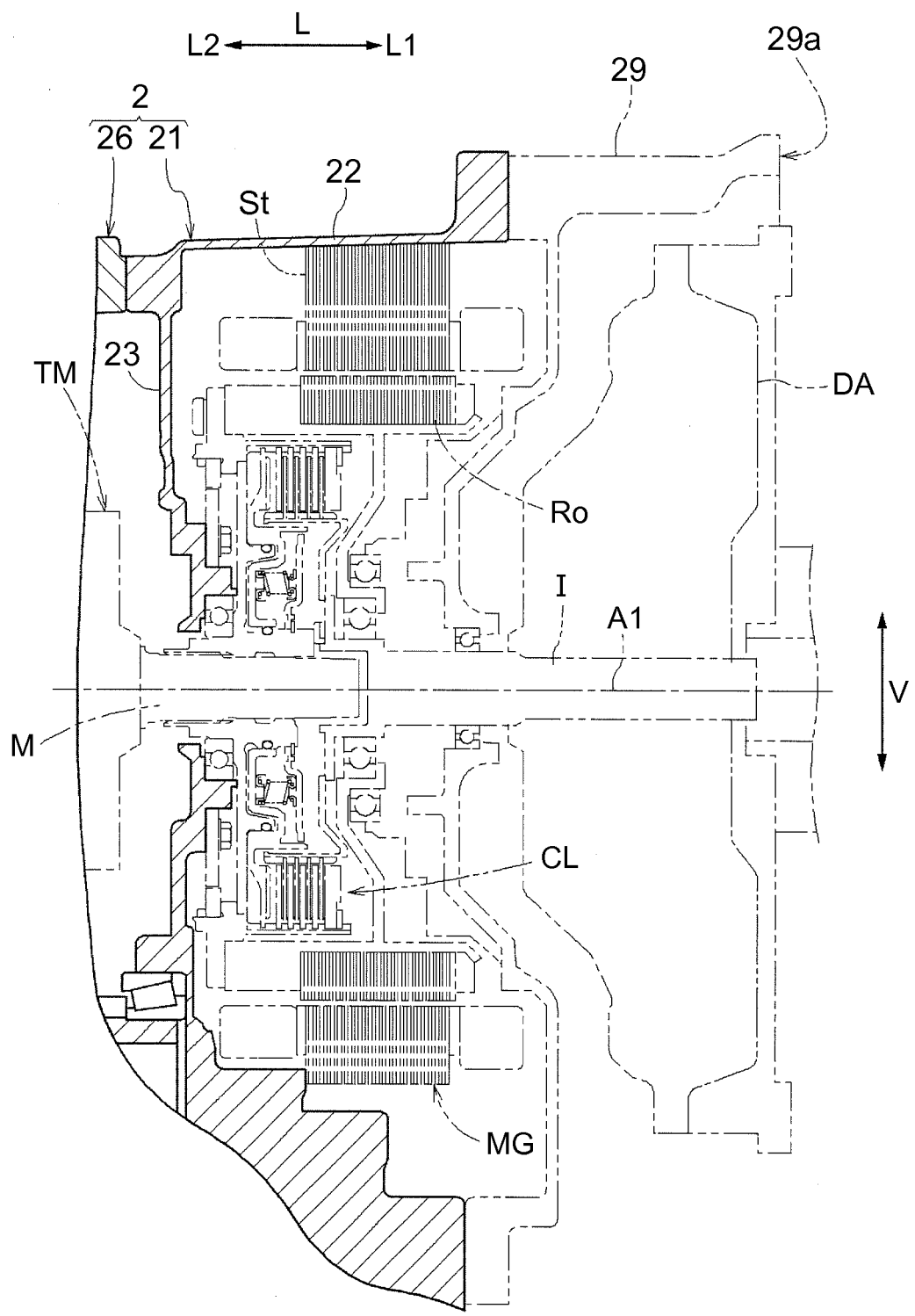
FIG. 10 is a sectional view showing another form of the case configuration.

(5) The above embodiment is described with respect to an example in which the case 2 includes the first case portion 21 accommodating the rotating electrical machine MG etc. and the second case portion 26 accommodating the speed change mechanism TM etc., and the first bonding surface 22a of the case 2 which is bonded to the internal combustion engine E is formed in the first case portion 21. However, embodiments of the present invention are not limited to this. For example, as shown in FIG. 10, in the case where a damper device DA is provided between the internal combustion engine E and the input shaft I, the case 2 may further include a third case portion 29 accommodating the damper device DA. The third case portion 29 can be interposed between the first case portion 21 and the internal combustion engine E. In this case, the internal combustion engine E is bonded to the end face (third bonding surface 29a) of the third case portion 29 on the first axial direction L1 side. In such an example, the third bonding surface 29a corresponds to the "bonding surface."

(6) The above embodiment is described with respect to an example in which only a part of the inverter device 3 is located in the region between the second reference line R2 and the third reference line R3 as viewed in the axial direction L. However, embodiments of the present invention are not limited to this. The inverter device 3 may be placed so that the entire inverter device 3 fits in the region between the second reference line R2 and the third reference line R3 as viewed in the axial direction L.

(7) The above embodiment is described with respect to an example in which the inverter device 3 is placed so that the entire inverter device 3 fits in the region surrounded by the fourth reference line R4, the fifth reference line R5, and the sixth reference line R6 as viewed in the axial direction L. However, embodiments of the present invention are not limited to this. The inverter device 3 may be placed so as to intersect at least one of the reference lines R4, R5, R6 as viewed in the axial direction L. In this case, if the inverter device 3 intersects the fifth reference line R5, it is preferable that the inverter device 3 be placed so as to be located inward of a seventh reference line R7 (see FIG. 6) that is defined outward of the fifth reference line R5 as viewed in the axial direction L. The seventh reference line R7 is an imaginary straight line touching the outer edge of the first case portion 21 and extending in the vertical direction V.

(8) The above embodiment is described with respect to an example in which the inverter device 3 includes the power section 31 and the capacitor section 32 which are different in size and shape from each other. However, embodiments of the present invention are not limited to this. The inverter device 3 may have any specific configuration, and various forms can be used for the inverter device 3. The inverter device 3 may include a voltage conversion section that carries out voltage conversion of DC power, in addition to the DC-AC conversion section. In the case where the inverter device 3 includes such a voltage conversion section, a switching element for voltage conversion, a rectifying element, etc. may also be included in the power section 31.

(9) The above embodiment is described with respect to an example in which the third gear 47 is placed on the axial first direction L1 side with respect to the first gear 45, and the inverter device 3 is placed on the axial first direction L1 side with respect to the third gear 47 and the lock mechanism 60 accordingly. However, embodiments of the present invention are not limited to this. For example, the third gear 47 may be placed on the axial second direction L2 side with respect to the first gear 45. In this case, the inverter device 3 is placed at least on the axial first direction L1 side with respect to the first gear 45, regardless of the positions of the third gear 47 and the lock mechanism 60 in the axial direction L. The third gear 47 that meshes with the engagement pawl 62 of the lock mechanism 60 may be formed in the speed change mechanism TM.

(10) Regarding other configurations as well, the embodiment disclosed in the specification is by way of example only in all respects, and embodiments of the present invention are not limited to this. That is, those configurations that are not described in the claims can be modified as appropriate without departing from the object of the present invention.

INDUSTRIAL APPLICABILITY

The present invention can be used for drive devices for single-motor parallel hybrid vehicles.

DESCRIPTION OF THE REFERENCE NUMERALS

1: Vehicle Drive Device
2: Case
3: Inverter Device
22a: First Bonding Surface (Bonding Surface)
29a: Third Bonding Surface (Bonding Surface)
41: Shaft Member
45: First Gear
46: Second Gear
47: Third Gear
60: Lock Mechanism
E: Internal Combustion Engine
I: Input Shaft (Input Member)
MG: Rotating Electrical Machine
TM: Speed Change Mechanism
Go: Shift Output Gear
C: Gear Mechanism
DF: Differential Gear Unit
Gi: Differential Input Gear
O: Output Shaft (Output Member)
W: Wheel
A1: First Axis
A2: Second Axis
A3: Third Axis
L: Axial Direction
H: Horizontal Direction
V: Vertical Direction
R1: First Reference Line
R2: Second Reference Line
R3: Third Reference Line
R4: Fourth Reference Line
R5: Fifth Reference Line

The invention claimed is:

1. A vehicle drive device, comprising:
an input member that is drivingly coupled to an internal combustion engine;
a plurality of output members that are respectively drivingly coupled to a plurality of wheels;
a rotating electrical machine;
a differential gear unit that distributes to the plurality of output members a driving force transmitted from the rotating electrical machine side;
an inverter device that is connected to the rotating electrical machine, a speed change mechanism having a shift output gear;
a gear mechanism; and
a case that accommodates the rotating electrical machine, the speed change mechanism, the gear mechanism, and the differential gear unit, the case having a bonding surface that is bonded to the internal combustion engine wherein
the input member and the rotating electrical machine are arranged side by side in an axial direction so that a first axis serves as a central axis of rotation thereof,
the differential gear unit is placed so that a second axis as a separate axis parallel to the first axis serves as an axis of rotation thereof,
in a plane perpendicular to the first and second axis, the following reference lines are defined:
　a first reference line perpendicularly intersects the first and second axis,
　a second reference line perpendicularly intersects the first axis and first reference line, and
　a third reference line perpendicularly intersects the second axis and first reference line,
at least a part of the inverter device is located so as to overlap the differential gear unit as viewed in a radial direction, and at least a part of the inverter device is located between the second reference line and the third reference line, as viewed in the axial direction,
the gear mechanism has a first gear that meshes with the shift output gear and a second gear that meshes with a differential input gear of the differential gear unit and that has a smaller diameter than the first gear, and the gear mechanism is placed so that a third axis as a separate axis parallel to the first axis and the second axis serves as an axis of rotation thereof and so that the second gear is located on the bonding surface side in the axial direction with respect to the first gear, and
the inverter device is located so that the inverter device fits between the bonding surface and the first gear in the axial direction.

2. The vehicle drive device according to claim 1, wherein at least a part of the inverter device overlaps the first gear as viewed in the axial direction.

3. The vehicle drive device according to claim 2, wherein at least a part of the inverter device is located so as to overlap the gear mechanism as viewed in the radial direction.

4. The vehicle drive device according to claim 3, wherein in a vehicle-mounted state, the third axis is located between the first axis and the second axis in a horizontal direction and vertically above the first axis and the second axis, as viewed in the axial direction, and
the entire inverter device is located so as to fit between a fourth reference line as an imaginary vertical straight line passing through the first axis and a fifth reference line as an imaginary vertical tangent line tangential to a circumscribed circle of the differential input gear, as viewed in the axial direction.

5. The vehicle drive device according to claim 4, wherein at least a part of the inverter device is located between the bonding surface and the second gear in the axial direction so as to overlap the second gear as viewed in the axial direction.

6. The vehicle drive device according to claim 5, wherein the gear mechanism has a shaft member that couples the first gear and the second gear, and
at least a part of the inverter device is located between the bonding surface and the shaft member in the axial direction so as to overlap the shaft member as viewed in the axial direction.

7. The vehicle drive device according to claim 6, further comprising:
a third gear formed in one of the gear mechanism and the speed change mechanism; and
a lock mechanism that restricts rotation of the wheels in a state where the lock mechanism meshes with the third gear, and permits rotation of the wheels in a state where the lock mechanism is released from the meshing state with the third gear, wherein
the entire inverter device is located between the bonding surface and the lock mechanism in the axial direction.

8. The vehicle drive device according to claim 7, wherein at least a part of the inverter device is located so as to overlap the rotating electrical machine as viewed in the radial direction.

9. The vehicle drive device according to claim 2, wherein at least a part of the inverter device is located between the bonding surface and the second gear in the axial direction so as to overlap the second gear as viewed in the axial direction.

10. The vehicle drive device according to claim 9, wherein the gear mechanism has a shaft member that couples the first gear and the second gear, and
at least a part of the inverter device is located between the bonding surface and the shaft member in the axial direction so as to overlap the shaft member as viewed in the axial direction.

11. The vehicle drive device according to claim 9, further comprising:
a third gear formed in one of the gear mechanism and the speed change mechanism; and
a lock mechanism that restricts rotation of the wheels in a state where the lock mechanism meshes with the third gear, and permits rotation of the wheels in a state where the lock mechanism is released from the meshing state with the third gear, wherein
the entire inverter device is located between the bonding surface and the lock mechanism in the axial direction.

12. The vehicle drive device according to claim 9, wherein at least a part of the inverter device is located so as to overlap the rotating electrical machine as viewed in the radial direction.

13. The vehicle drive device according to claim 2, further comprising:
a third gear formed in one of the gear mechanism and the speed change mechanism; and
a lock mechanism that restricts rotation of the wheels in a state where the lock mechanism meshes with the third gear, and permits rotation of the wheels in a state where the lock mechanism is released from the meshing state with the third gear, wherein
the entire inverter device is located between the bonding surface and the lock mechanism in the axial direction.

14. The vehicle drive device according to claim 2, wherein at least a part of the inverter device is located so as to overlap the rotating electrical machine as viewed in the radial direction.

15. The vehicle drive device according to claim 3, wherein at least a part of the inverter device is located between the bonding surface and the second gear in the axial direction so as to overlap the second gear as viewed in the axial direction.

16. The vehicle drive device according to claim 15, wherein
the gear mechanism has a shaft member that couples the first gear and the second gear, and
at least a part of the inverter device is located between the bonding surface and the shaft member in the axial direction so as to overlap the shaft member as viewed in the axial direction.

17. The vehicle drive device according to claim 3, further comprising:
a third gear formed in one of the gear mechanism and the speed change mechanism; and
a lock mechanism that restricts rotation of the wheels in a state where the lock mechanism meshes with the third gear, and permits rotation of the wheels in a state where the lock mechanism is released from the meshing state with the third gear, wherein
the entire inverter device is located between the bonding surface and the lock mechanism in the axial direction.

18. The vehicle drive device according to claim 3, wherein
at least a part of the inverter device is located so as to overlap the rotating electrical machine as viewed in the radial direction.

19. The vehicle drive device according to claim 4, further comprising:
a third gear formed in one of the gear mechanism and the speed change mechanism; and
a lock mechanism that restricts rotation of the wheels in a state where the lock mechanism meshes with the third gear, and permits rotation of the wheels in a state where the lock mechanism is released from the meshing state with the third gear, wherein
the entire inverter device is located between the bonding surface and the lock mechanism in the axial direction.

20. The vehicle drive device according to claim 8, wherein
at least a part of the inverter device is located so as to overlap the rotating electrical machine as viewed in the radial direction.

* * * * *